W. LARSON.
MECHANICAL THERMOMETER.
APPLICATION FILED OCT. 4, 1920.
1,383,827.
Patented July 5, 1921.
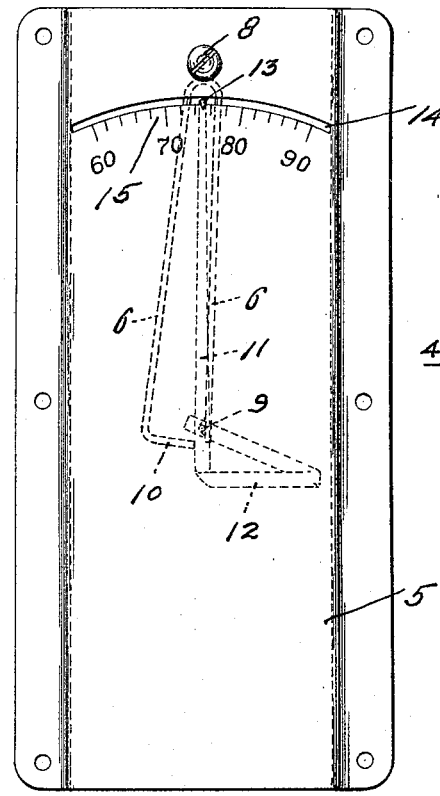
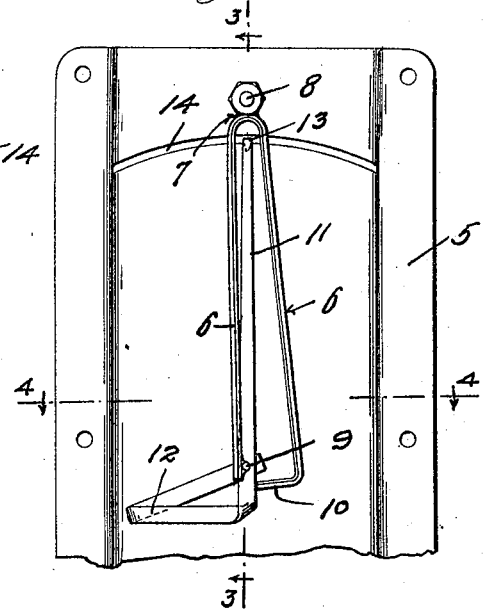
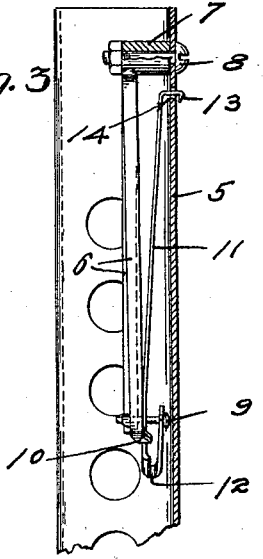
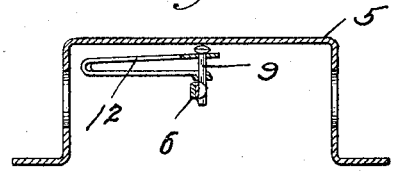
Inventor
William Larson
By his Attorney
Harry D. Kilgore

UNITED STATES PATENT OFFICE.

WILLIAM LARSON, OF MINNEAPOLIS, MINNESOTA.

MECHANICAL THERMOMETER.

1,383,827. Specification of Letters Patent. Patented July 5, 1921.

Application filed October 4, 1920. Serial No. 414,577.

*To all whom it may concern:*

Be it known that I, WILLIAM LARSON, a citizen of the United States, residing at Minneapolis, in the county of Hennepin and State of Minnesota, have invented certain new and useful Improvements in Mechanical Thermometers; and I do hereby declare the following to be a full, clear, and exact description of the invention, such as will enable others skilled in the art to which it appertains to make and use the same.

My invention has for its object to provide an extremely simple and highly efficient mechanical thermometer, and to such end, generally stated, the invention consists of the novel devices and combinations of devices hereinafter described and defined in the claims.

This mechanical thermometer is capable of general use, but will be found especially serviceable in connection with the thermostats of heat regulating systems.

As preferably designed, the thermometer comprises but three elements, to wit: a case or support, an approximately U-shaped thermally influenced expansion element, and a pivoted indicator arm. The indicator arm is pivoted to one prong of the expansion element, is weighted at one side of its pivot, and its movement is stopped against the other prong of said expansion element. The indicator arm coöperates with a thermometer scale or graduation preferably applied on the case or support to which the expansion element is attached at its fork or bowed end.

The invention is illustrated in the accompanying drawings, wherein like characters indicate like parts throughout the several views.

Referring to the drawings:

Figure 1 shows the thermometer in front elevation;

Fig. 2 shows the thermometer in rear elevation, some parts being broken away;

Fig. 3 is a section taken approximately on the line 3—3 of Fig. 2; and

Fig. 4 is a section taken approximately on the line 4—4 of Fig. 2.

The case or support of the thermometer may take various forms, but as illustrated, is a pressed sheet metal channel 5, substantially of the form frequently used in connection with thermostats of heat regulating systems.

The expansion element 6 is an approximately U-shaped member, preferably made of laminated expansion metal, the inner layer of which has a different co-efficient of expansion from that of the outer layer. At its fork or bowed upper portion, the expansion element 6 is shown as formed with the sleeve 7, that is rigidly secured to the upper portion of the case 5 by a nut bolt 8.

At the end of one of its prongs, the expansion element 6 has a laterally offset pivot pin 9, and the other prong of said element 6 has a horizontally bent prong extension 10 that is offset laterally, so that it comes in front of at least a portion of the projecting pivot pin 9.

The indicator arm 11 is preferably made from a single flat bar of metal bent to form a laterally off-set loop 12, one end of which is turned back so that it comes into a position opposite to the lower portion of arm 11 and this adapts said pivot pin to be passed through the lower portion of said indicator arm and through the offset end of the loop 12 thereof. This affords a good pivoted connection between the indicator arm and one prong of the expansion element 6. The offset loop 12 acts as a weight which holds the lower end of the indicator arm 11 normally in light contact with the prong extension 10.

At its free upper end, the indicator arm 11 has a forwardly projected finger 13 that works through a segmental slot in the case 5. This slot 14 extends on the arc of a circle struck approximately from the axis of the pivot pin 9. Adjacent to the slot 14, the case 5 has a thermometer scale or graduation indicated at 15.

Under increasing temperature, the prongs of the expansion element 6 will separate and impart movement both to the pivot pin 9 and to the stop-acting prong extension 10, and such movements will permit the indicator arm 11, under the action of its weighted portion 12, to move toward the right in respect to Fig. 1, or toward the left in respect to Fig. 2, thus indicating higher temperatures on the scale 15. Of course under lowering temperatures the above described actions will be reversed.

The fact that the indicator arm is pivoted to and carried by one prong and its movement stopped by the other prong of the U-shaped expansion element, causes the movement of both prongs to effect the oscillatory movements of the indicator arm and makes the indicating action extremely sensitive to slight changes in temperature.

The device is so simple in its construction and operation that it is not at all likely to get out of order. It cannot, of course, freeze up, and hence, will stand the lowest temperatures as well as very high temperatures. However, the device is especially intended for house uses where the range of variation in temperature is not very great. Obviously, the device is of small cost. To effect the proper initial adjustment of the thermometer, it is only necessary to bend one or the other of the prongs at the expansion element 6, so that the indicator arm will be set to indicate the proper temperature on the scale 15.

What I claim is:

1. In a mechanical thermometer an approximately U-shaped expansion element having its prongs turned downward, and an indicator arm pivoted to one prong of said expansion element and stopped by the other prong thereof, said arm being weighted at one side of its pivot so that it will maintain contact with the stop acting prong of said expansion element.

2. In a mechanical thermometer an approximately U-shaped expansion element having its prongs turned downward, an indicator arm pivoted to one prong of said expansion element and stopped by the other prong thereof, and yielding means independent of the expansion element for holding said arm in contact with the stop acting prong of said expansion element.

3. In a mechanical thermometer an approximately U-shaped expansion element having its prongs turned downward and both free for movement, and an indicator arm pivoted to one prong of said expansion element and stopped by the other prong thereof, said arm being weighted at one side of its pivot so that it will maintain contact with the stop-acting prong of said expansion element.

4. In a mechanical thermometer, an approximately U-shaped expansion element supported with both prongs free for movement, one prong thereof, having an offset pivot-pin and the other prong thereof having an offset stop-acting extension and an indicator arm formed from a single bar of metal bent to form an offset weight-acting loop that is pivotally mounted on the pivot pin of the one prong of said expansion element, said loop acting as a weight holding said arm against the stop-acting extremity of the other prong of said expansion element.

In testimony whereof I affix my signature.

WILLIAM LARSON.